US005583478A

United States Patent [19]
Renzi

[11] Patent Number: 5,583,478
[45] Date of Patent: Dec. 10, 1996

[54] VIRTUAL ENVIRONMENT TACTILE SYSTEM

[76] Inventor: Ronald Renzi, 90 Arroyo Seco Way, Tracy, San Joaquin County, Calif. 95376

[21] Appl. No.: 397,291

[22] Filed: Mar. 1, 1995

[51] Int. Cl.$^6$ .................................................. H04B 3/36
[52] U.S. Cl. .......................... 340/407.1; 341/20; 341/21; 341/27; 414/5; 73/865.7
[58] Field of Search ........................... 340/407.1, 407.2, 340/825.19, 965; 73/862.04, 865.7; 434/112, 113, 114, 115; 414/4, 5, 6, 7; 341/20, 21, 27

[56] References Cited

U.S. PATENT DOCUMENTS

| | | | |
|---|---|---|---|
| 3,987,438 | 10/1976 | Lindenmueller | 340/407.1 |
| 4,302,138 | 11/1981 | Zarudiansky | 414/5 |
| 4,481,815 | 11/1984 | Overton | 73/432 |
| 4,533,890 | 8/1985 | Patel | 335/234 |
| 4,871,992 | 10/1989 | Petersen | 434/112 |
| 4,884,223 | 11/1989 | Ingle et al. | 364/550 |
| 4,964,302 | 10/1990 | Grahn et al. | 73/865.7 |
| 5,010,772 | 4/1991 | Bourland et al. | 73/862.04 |
| 5,184,319 | 2/1993 | Kramer | 414/5 |
| 5,354,162 | 10/1994 | Burdea et al. | 414/5 |

OTHER PUBLICATIONS

Shimoga, IEEE Proceedings 1993 Virtual Reality Annual International Symposium, Seattle, WA, pp. 271–279.

*Primary Examiner*—Jeffery Hofsass
*Assistant Examiner*—Van T. Trieu
*Attorney, Agent, or Firm*—Donald A. Nissen; Gregory A. Cone; Timothy D. Stanley

[57] ABSTRACT

A method for providing a realistic sense of touch in virtual reality by means of programmable actuator assemblies is disclosed. Each tactile actuator assembly consists of a number of individual actuators whose movement is controlled by a computer and associated drive electronics. When an actuator is energized, the rare earth magnet and the associated contactor, incorporated within the actuator, are set in motion by the opposing electromagnetic field of a surrounding coil. The magnet pushes the contactor forward to contact the skin resulting in the sensation of touch. When the electromagnetic field is turned off, the rare earth magnet and the contactor return to their neutral positions due to the magnetic equilibrium caused by the interaction with the ferrous outer sleeve. The small size and flexible nature of the actuator assemblies permit incorporation into a glove, boot or body suit. The actuator has additional applications, such as, for example, as an accelerometer, an actuator for precisely controlled actuations or to simulate the sensation of braille letters.

15 Claims, 12 Drawing Sheets

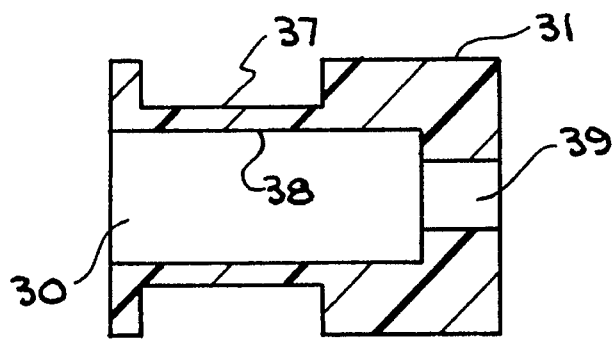 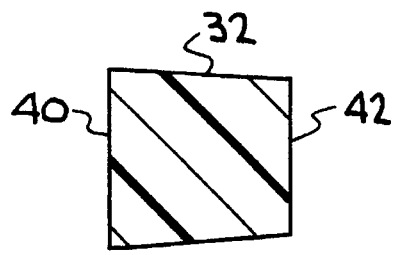
FIG. 4A  FIG. 4B
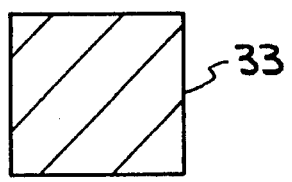 
FIG. 4C  FIG. 4D
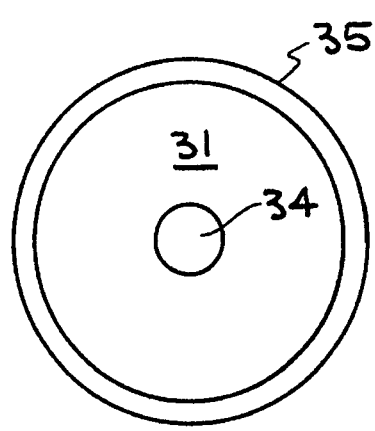 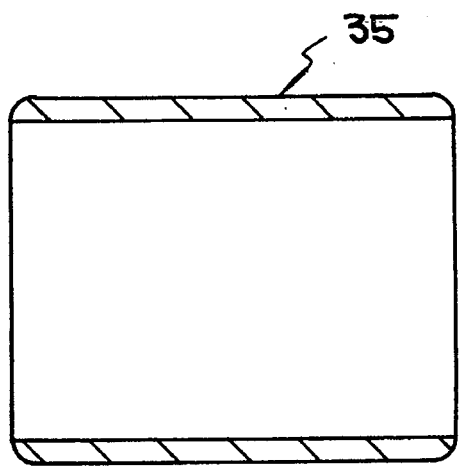
FIG. 4E  FIG. 4F

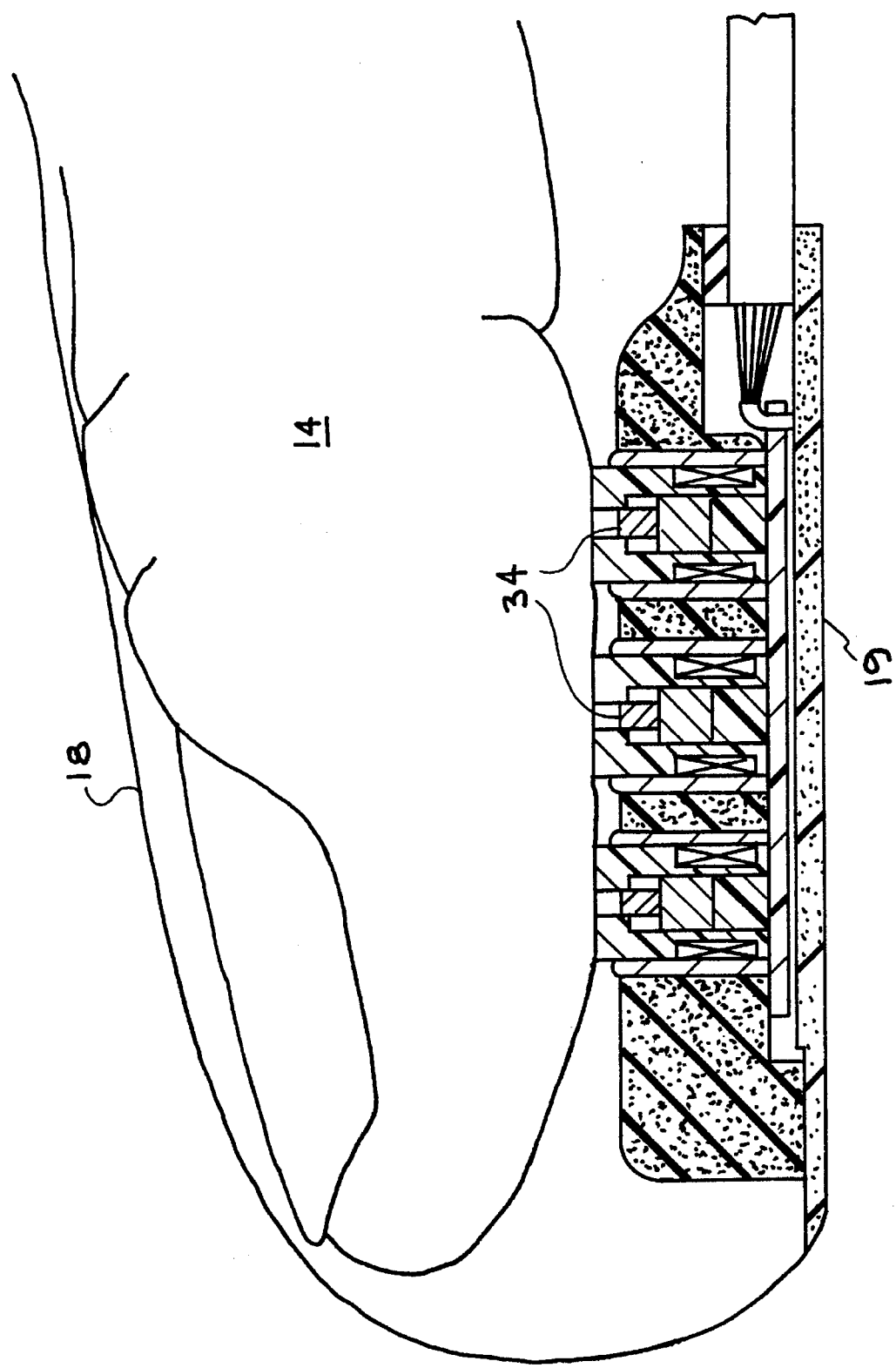

5,583,478

VIRTUAL ENVIRONMENT TACTILE SYSTEM

STATEMENT OF GOVERNMENT INTEREST

The U.S. Government has rights in this invention pursuant to Contract No. DE - AC04-94AL8500 between the Department of Energy and Sandia Corporation.

BACKGROUND OF THE INVENTION

The present invention relates generally to systems for providing tactile feedback in virtual reality environments, and more particularly to a system for providing tactile feedback in a virtual reality environment, in which the tactile feedback is in the form of vibrotactile stimulation.

A variety of systems that provide the user with the sense of touch in a virtual reality or synthetic environment have been developed. The article by Karun B. Shimoga, "A Survey of Perceptual Feedback Issues in Dexterous Telemanipulations: Part II. Finger Touch Feedback," IEEE Proc. 1993 Virtual Reality Annual Int'l Symposium, Seattle, Wash., Sept., 271–279, discusses several of the existing systems for providing tactile feedback in synthetic environments. Shimoga classifies the existing systems as: (1) Visual displays; (2) Pneumatic stimulation (air jets, air pockets and air rings); (3) Vibro-tactile stimulation (vibrating blunt pins and vibrating voice coils); (4) Electrotactile stimulation; and (5) Functional Neuromuscular Stimulation (FNS).

In visual display systems, the status of touch of the slave fingers is indicated by the appearance of an icon or by the display of slave finger tip forces. One approach displays the locations of two fingers and the boundaries of the object as separate icons, which permits the user to determine the relationship between the fingers and the object surface. In another approach, the object boundary icons are displayed at all times, while the finger tip icons appear only when the fingers touch the object. These display approaches require the user to rely on the display in determining contact with the object. This indirect tactile feedback is less desirable since it limits the user to relatively slow finger movement. In addition, a tactile feedback display device is useless to a visually-impaired individual, which therefore limits the applications that might incorporate such a tactile feedback device.

Three versions of the pneumatic stimulation approaches are depicted in FIGS. 8–10 of the present application. FIG. 8 depicts a pneumatic stimulation tactile feedback system. In this version, a 12×12 array of micro air jets force air against the ventral surfaces of the operator's fingers, which are enclosed in a position sensing glove. This system was used to transmit alphabet characters to visually-impaired individuals.

FIG. 9 depicts an air pocket system in which minute air pockets are placed under the fingers 92 facing the finger tip pulps. As in FIG. 8, the fingers are enclosed in a glove. These air pockets are then pressurized to signal the touch of the remote finger. The touch sensor signal from the remote slave activates a pressure regulator that varies the air pressure within the mini air pockets.

FIG. 10 shows an air ring pneumatic system. In this system, ring-like inflatable balloon actuators are placed on the operator's fingers. When the rings are pressurized, the resulting squeezing sensation on the fingers can be interpreted as the signal of touch. The fingers are enclosed in a glove.

In all tactile feedback systems, as the number of skin contacts per unit area decreases, so does the effectiveness of the touch feedback. At the other extreme, as the number of skin contacts per unit area increases beyond a point, no further useful information is received by the fingers. The threshold point is where the spacing between the two skin contacts is equal to the minimum distance between two points that the human skin can discriminate at that location. This is referred to as the two point discrimination ability of the human hand. A disadvantage with the air jet systems is that the fingers get numb and temporarily lose their tactile abilities and thus have inferior two point discrimination ability. Furthermore, all pneumatic tactile feedback systems have an inherently slow response time, which limits the operating bandwidth of these devices, and hence the types of signals that can be sent to the user.

Shimoga, ibid., discloses a vibro-tactile stimulation system (FIG. 11) which uses an array of thin blunt wires placed below each finger. The wires then are vibrated at a desired frequency and amplitude using a battery of electric solenoids. The resulting tickling sensation on the fingers can be perceived by the operator as the touch feedback signal. This system is very complex, noisy and consumes a relatively large amount of power. Such a device is not simple enough to be mass produced.

Patrick (see also Exos, Product Literature on Dexterous Hand Master and Grip Master, Exos, Inc., Lexington, Mass. (1991)), discusses the EXOS Touchmaster, which uses conventional voice coil technology. This vibro-tactile system uses vibrating voice coils placed below each finger. The voice coils utilize an internal moving electromagnet with a fixed external magnet. The voice coils transmit low amplitude high frequency vibrations onto the skin of the operator. Compared to the vibrating pin systems this system has reduced mechanical complexity, noise and power consumption. Furthermore, this device is relatively small, is portable and does not restrict the normal range of finger motion in comparison to the vibrating pin system. The operating frequency of this device is about 250 Hz, which is approximately the optimum frequency at which the skin of human fingers is highly sensitive. This higher bandwidth permits improved mean task error over visual feedback systems in teleoperation and interaction with virtual environments, however, this system is relatively complex and thus costly. Furthermore, this system is relatively rigid and does not conform easily to the contour of one's skin. An array of vibrating piezoelectric crystals has been used in lieu of voice coils. Such a system is rather complex, and consumes too much power to be a portable device, which limits its ability to be mass produced.

FIG. 12 depicts an electrotactile approach in which mini electrodes are attached to the operator's fingers and hand, which provide electrical pulses of appropriate width and frequency to the operator's skin to signal remote touch. The resulting tickling sensation will imply to the operator that the slave fingers are touching something.

Electrical pulses can be used to provide stimulation to astronauts wearing thick gloves. This approach has the disadvantage that some operators dislike feeling electrical signals. Furthermore, the pulse width and frequency of the stimulation are crucial to properly simulating touch. In addition, extreme care must be taken in choosing the locations for placing the extero-cutaneous electrodes.

Another approach uses invasive techniques that apply signals directly to the neuromuscular system. If appropriately done, the operator's brain will interpret these signals as the touch of his own fingers. This approach has the disadvantages that connection must be made to the neuromuscular system, and involves high liability risks. As in the above electrotactile system, extreme care must be taken in choosing the locations for placing the intramuscular electrodes.

Another existing system, called a Tactor (depicted in FIG. 13), uses an array of tactors, which are connected to the system by wires made of a Shape Metal Alloy (SMA). The SMA is a Nickel-Titanium alloy, which returns to a predetermined shape when heated. In this device 130, a current passing through a wire of this Ni—Ti alloy causes the wire to shrink, which then causes the tip to press against the skin. Levers are formed from a sheet of BeCu. Each lever is bent up to protrude through a hole in the touch plate. An SMA wire is attached near the end of each lever and angles upward to a connector block. Electrical leads carry current from the computer (not shown) through the SMA wires. The BeCu base 136 makes a common electrical connection to all SMA wires. Electrical heating of the SMA wire causes the wire to contract, driving the tactor upward through the touch plate, where it contacts the finger. This device operates at about a 10 Hz response time. The most sensitive response of the human skin occurs at about 200 Hz, while additional sensation occurs until about 250 Hz. Thus, this device cannot provide a sufficient bandwidth range of operation.

Shimoga, ibid., has identified several requirements for those systems that apply forces to the human fingers. When human fingers are exposed to constant forces over sustained periods, the ability of the fingers to sense magnitudes and directions of the forces being applied temporarily deteriorates. Furthermore, human fingers cannot sense forces below $0.2 N/cm^2$. Yet, human fingers also get fatigued when exposed to large pressures for prolonged periods. Thus, the contact areas must be designed such that the nominal pressure on the skin lies above the threshold pressure of $0.2 N/cm^2$. Several requirements are necessary in a tactile feedback system in the form of an instrumented glove. First, the glove must be lightweight to reduce operator fatigue and to increase portability. Second, the glove must be compact and must not limit the natural motion ranges of the human fingers. Third, the glove must be precise in its measurements and its perceptual feedback. Fourth, the glove must be inexpensive. Fifth, the glove must avoid the use of sensory substitution, i.e., the system should be such that the operator does not have to think to understand the meaning of the signal. Finally, the system should be safe to use for extended periods of time and should be compatible with the dimensions and the motion ranges of the human hand. In addition, certain areas of the human hand that play an important role in grasping and manipulation have been identified. FIG. 14 depicts the zones of the palm and fingers of the human hand, identified by Shimoga, ibid., that are functional during grasping and manipulation tasks. The important areas are the distal phalanges of the thumb and the fingers as well as the central palmer region on the ventral side of the hand. Thus, a tactile feedback system need only cover these areas alone.

The requirements for the number of skin contacts that must be placed over a unit area so that the operator's fingers get adequate sensation of touch, i.e., the two point discrimination ability, have been identified. The index finger pulp can sense all points that are over 2 mm apart, while the center of the palm cannot discriminate two points that are less than 11 mm apart. Therefore, the optimum number of skin contacts per unit area at a given location on the hand must be such that the distance between two adjacent skin contacts are be equal to the two point discrimination ability of the skin at that location.

There are, in addition, requirements relating to the cross-sectional area of the skin contacts. For a given functional frequency, the minimum amplitude of vibration that the fingers can sense increases with a decrease in the cross-sectional area of the contact. A decrease in the contact area by about 1000 times (from $5.1 cm^2$ to $0.005 cm^2$) increases the minimum sensible amplitude by 30 times (from $-15$ dB to $+15$ dB). Experimental results indicate that the displacement versus contact area curve seems to level off below $0.02 cm^2$ and above $8 cm^2$. Consequently, there is no advantage in increasing the contact area above $8 cm^2$ or decreasing it below $0.02 cm^2$. Within these limits, the variation in displacement is on the order of microns only and hence choosing the cross-sectional area must be constrained by the necessary displacement.

The minimum amplitude sensible is a function of both the contact's cross-sectional area and the frequency. For a smaller amplitude, larger cross-sectional areas are preferred. However, the two point discrimination ability of the finger places an upper limit on the contact's area. Once the cross-sectional area is chosen, the amplitude is only a function of the frequency of vibration. The amplitude for a given area has a minimum between 200 Hz and 300 Hz (about 250 Hz). Thus, operating around 250 Hz would require minimum displacement (or amplitude vibration) to provide the necessary stimulation to the skin of the human fingers.

The present invention overcomes the problems associated with the tactile feedback systems previously described. The present invention is therefore directed to the problem of developing a vibro-tactile feedback system for providing the user the sensation of touch in a synthetic or virtual reality environment that is simple to manufacture and conforms to the contour of one's skin, yet affords the user a realistic sense of touch.

SUMMARY OF THE INVENTION

The present invention solves the problems described above by using an external electromagnet and a moving, internal rare earth magnet in an actuator. The actuator incorporates an external ferrous housing as a recoil mechanism such that the internal rare earth magnet returns to its initial position within the housing. The ferrous housing also eliminates interference between the actuators and consequently improves performance. As a result of the design, the actuator of the present invention requires very low currents and voltages to operate, yet operates at frequencies up to approximately 300 Hz. Consequently, a system incorporating multiple actuators presents no safety hazard to the user or others.

The actuator assembly of the present invention comprises a matrix (or array) of actuators, for example, a 3×3 array of actuators, disposed in a single housing. One actuator assembly containing multiple actuators may be provided for on the skin area to be contacted, for example, each finger, thumb or palm. Different combinations of actuators in the matrix are possible, such as 4×2 or 4×4, depending upon the two point discrimination ability of the skin area to be contacted. This matrix of actuators permits the device to accurately simulate surfaces being "touched" in a synthetic environment. Since the actuator of the present invention has an operating bandwidth that approaches 300 Hz and since the actuator assembly incorporates multiple actuators, textures can now be simulated by the present invention. Up to a point more actuators in the matrix will increase the ability of the system to simulate the sense of touch.

Another advantageous design feature of the present invention is the flexible housing used for housing the matrix of actuators in the actuator assembly. Using a flexible backplane printed circuit board and a flexible actuator bonding material in the housing allows the whole assembly of actuators to conform to the contour of the skin, which increases the ability of the actuator assembly to simulate the sense of touch.

In addition, the flexible actuator assembly housing permits the entire actuator assembly to be incorporated into a glove, boot or body suit. An instrumented glove permits the operator to quickly insert his or her fingers into the device, without worrying about making all the appropriate connections. Boots and bodysuits would allow the user to receive tactile feedback all over the body, while enabling the user to quickly instrument himself or herself.

In the glove version of the system of the present invention, it is particularly advantageous if a matrix of actuators is placed on the palm. This permits simulation of grasping.

The tactile feedback system of the present invention employs several actuator assemblies, one for each skin area to be contacted. Each actuator in each actuator assembly is independently addressable by a processor, which is coupled to each actuator by small wires. The processor transmits a unique waveform specified by its operating program to each actuator. Each actuator contacts the skin at the amplitude and frequency specified by the processor. The resulting contact by several actuators on the skin simulates the desired sense of touch.

The qualitative features of the system of the present invention are as follows: The system is simple, and easy to miniaturize; The system accurately simulates the sense of touch; Hand movement is not restricted. The tactile feedback system is quiet, comfortable and durable.

The objects of the present invention together with additional objects, novel features and advantages thereof over existing prior art forms, which will become apparent to those skilled in the art from detailed disclosure of the present invention as set forth hereinbelow, are accomplished by the improvements herein described and claimed.

BRIEF DESCRIPTION OF THE DRAWINGS

FIGS. 4A–4F depict several parts of the actuator depicted in FIG. 4.

FIG. 6 depicts a cross-section of the actuator, when the actuator is sewn into a glove.

DETAILED DESCRIPTION OF THE INVENTION

Before discussing several embodiments of the present invention, some sensory properties of the human hand need to be reviewed. These properties are requirements for the tactile feedback system of the present invention. The most sensitive frequency range of the human hand, lies between 200 and 300 Hz, hence the tactile feedback system must be able to respond in this frequency band. The human hand can only sense vibratory amplitudes greater than 1 micrometer at 250 Hz. The linear displacement of the amplitude must be greater than 0.015 inches (380 microns). The adaption time lies between 100–200 microseconds. The lowest sensible pressure is approximately $0.2 N/cm^2$. The resolution limit is 2 mm spacing. The maximum activation energy is 500 v, when using UL approved 0.020 rubber gloves. These requirements place limits on the smallest possible size of the actuator.

Figure 1:
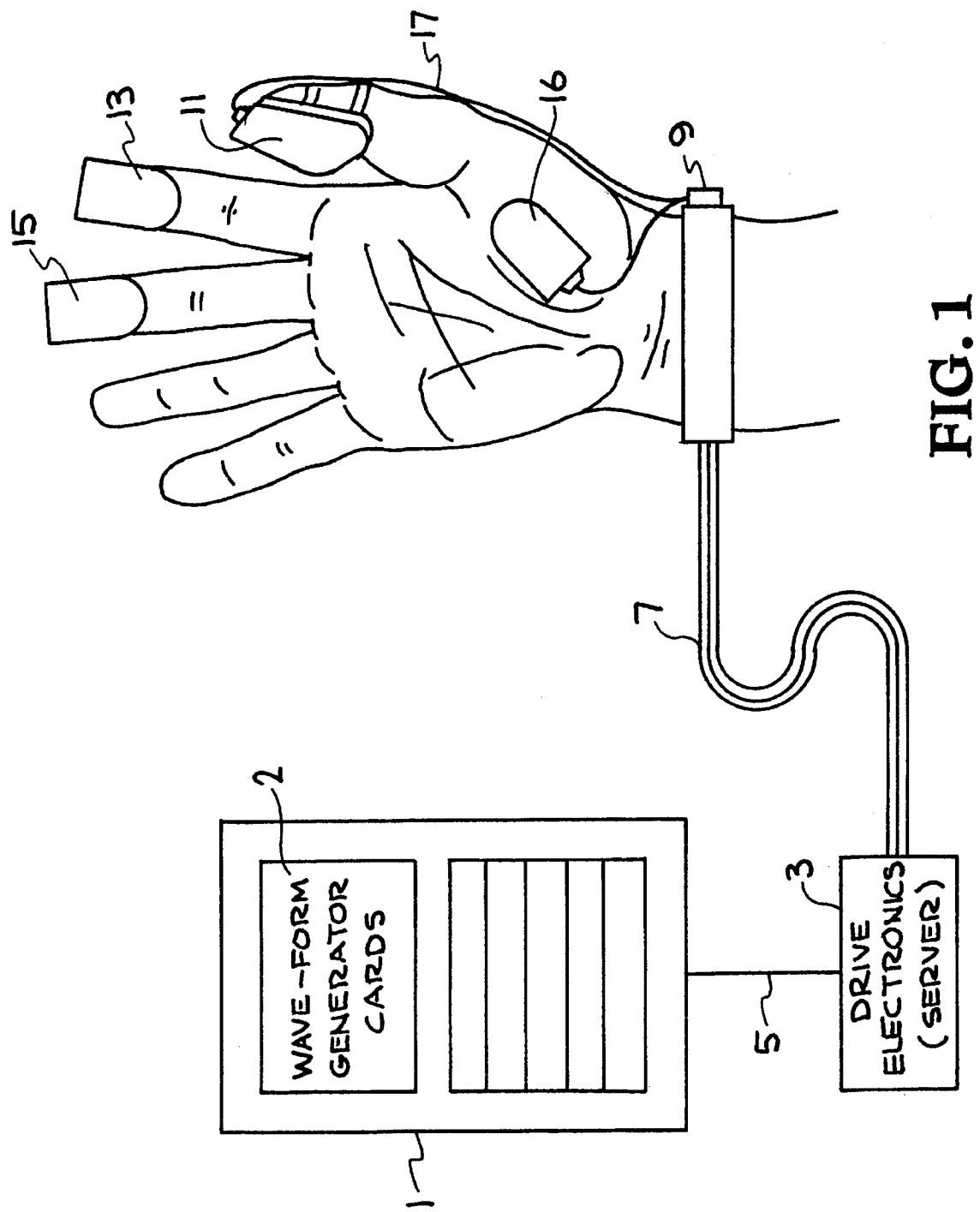
FIG. 1 depicts a block diagram of the virtual environment tactile system of the present invention.

Referring now to FIG. 1, one embodiment of the Virtual Environment Tactile System (VETS) consists of a computer 1 coupled to a drive electronics 3 via an RS-232 line 5, and four tactile actuator assemblies 11, 13, 15 and 16 coupled via wiring 17 to a wrist connector 9. The connectors used at the wrist connector 9 are very small and lightweight to prevent operator fatigue. One possible embodiment of the connectors used in the wrist connector 9 are connectors manufactured by Limo, which have 14 pins encased in a plastic housing. Fourteen pins permits a maximum density of 13 actuators using a common ground.

In the embodiment depicted in FIG. 1, tactile actuator assemblies are fitted to the thumb 11, index finger 13 and middle finger 15, as well as to the palm 16. Additional actuator assemblies could be placed on the remaining fingers, or other parts of the hand, however, these are not depicted for simplicity purposes. In fact, the small size of the actuators permits actuator assemblies to be placed at any location desired by the user. Furthermore, the spacing of the actuators due to their small size permits the actuators to be placed within the minimum two point discrimination ability (about 2 mm) of the most sensitive parts of the human skin, i.e., the tip of the index finger.

Each of these tactile actuator assemblies 11, 13, 15 and 16 is connected to the wrist connector 9 via wiring 17 that runs over the back of the hand. A ribbon cable 7 couples the wrist connector 9 to the drive electronics 3. Each of the components depicted on the hand in FIG. 1 could be sewed into a glove, boot or body suit to permit easy attachment to the tactile feedback system, but are not depicted so for clarity purposes.

Figure 2:
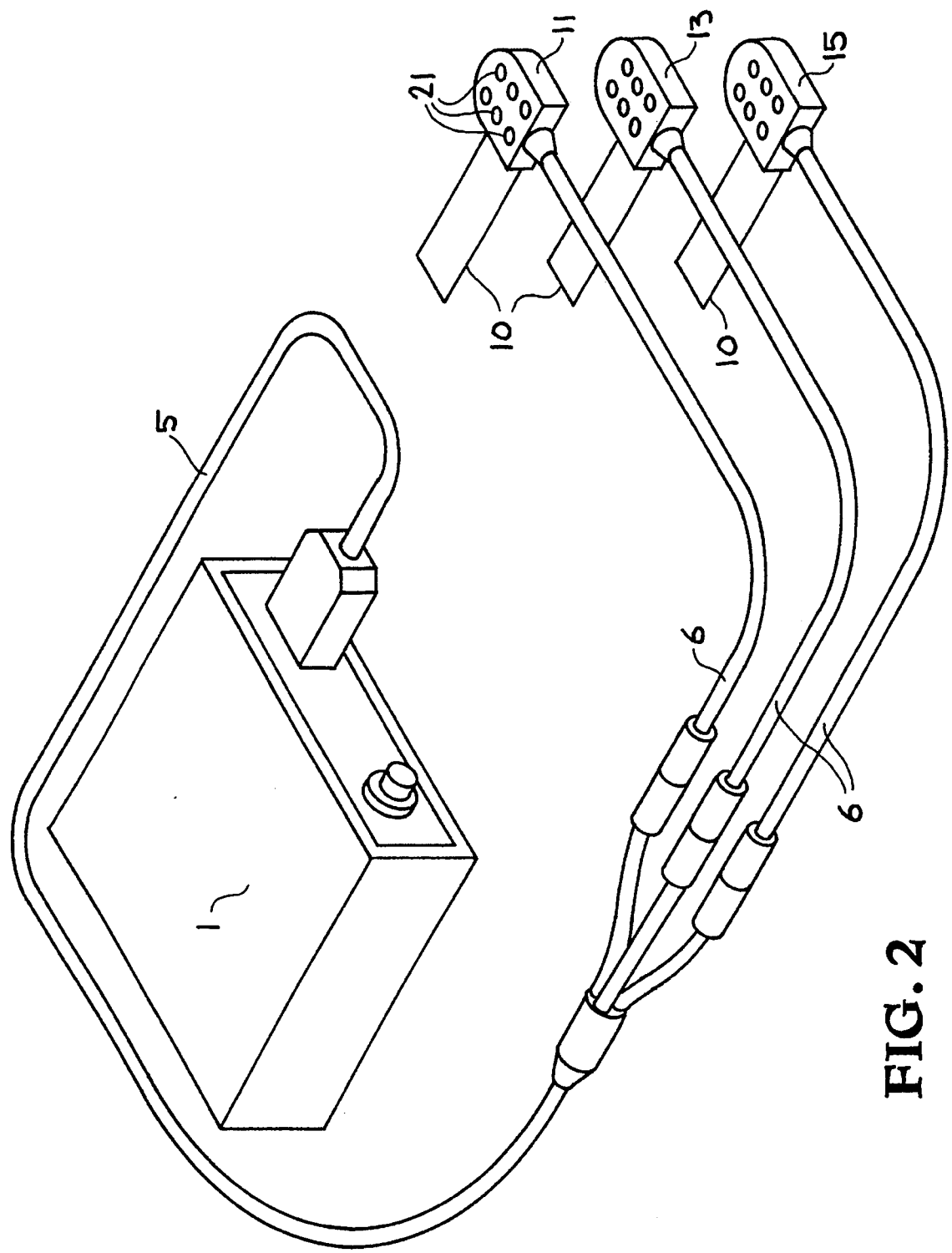
FIG. 2 depicts an alternative embodiment of the virtual environment tactile system of the present invention.

Another possible embodiment is depicted in FIG. 2. In this embodiment, standard cables 6 are used to couple the tactile actuator assemblies 11, 13, 15 and 16, as shown in FIG. 1, to the computer/drive electronics 1.

As shown in FIG. 2, one embodiment of the actuator assembly includes a strap 10, e.g., made of velcro material, to hold the actuator assembly in place on the user's finger or thumb.

Figure 3:
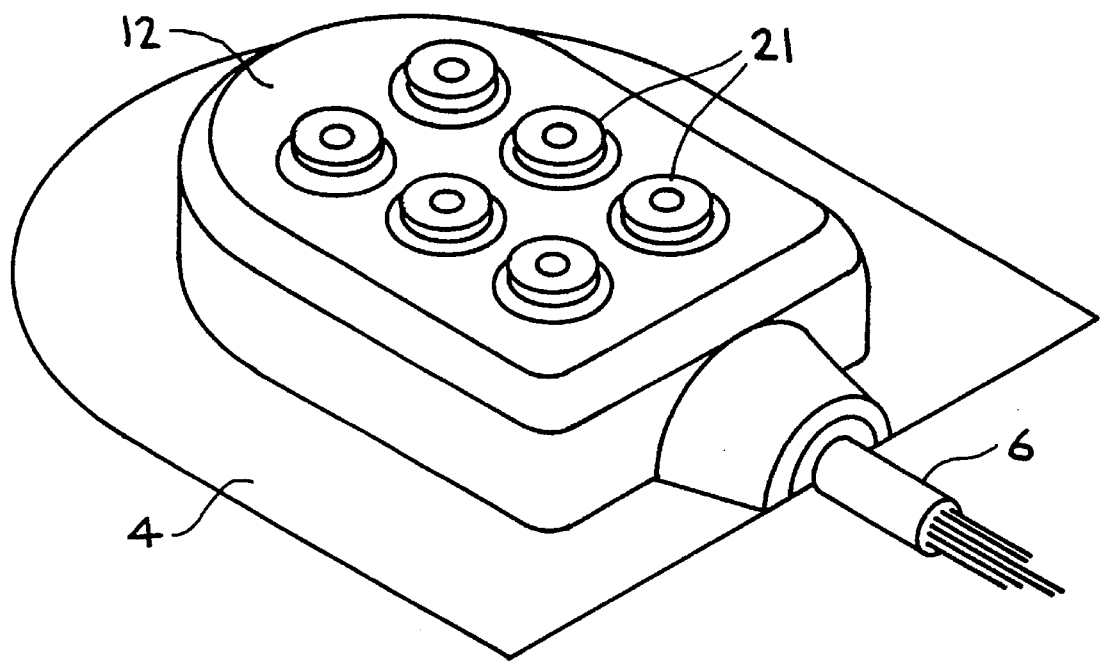
FIG. 3 depicts the actuator assembly of the present invention.

FIG. 3 depicts one of the actuator assemblies shown in FIG. 1, such as 11, 13, 15 or 16. The cable 6 couples the actuator assembly to the computer 1 and drive electronics 3, shown in FIG. 1. The actuators 21 are depicted in a 2×3 matrix, however, other combinations are possible, such as 3×3 or 4×4. The actuators 21 are bonded in a flexible foam 12. One other possible embodiment of the actuator 21 uses a hard bonding material rather than the flexible foam 12 for uses where additional durability is required. The entire actuator assembly is then bonded to a fabric mesh 4 so that it can be sewn into a glove or other clothing.

In this embodiment, each tactile actuator assembly 11, 13, 15 or 16 consists of a matrix of six individual actuators 21. In this application, the matrix of actuators refers to several actuators disposed in a two dimensional pattern. More actuators in the matrix provides a more realistic simulation of touch, however, the number of actuators 21 is limited by the size of each individual actuator 21. A fourth actuator 16 assembly (shown in FIG. 1) can be affixed to another part of the user's skin, such as the user's palm. An actuator located on the palm permits a realistic simulation of grasping in a virtual environment. Locations of additional actuators are only limited by the need of a particular application and the imagination of the application's creator.

Figure 4:
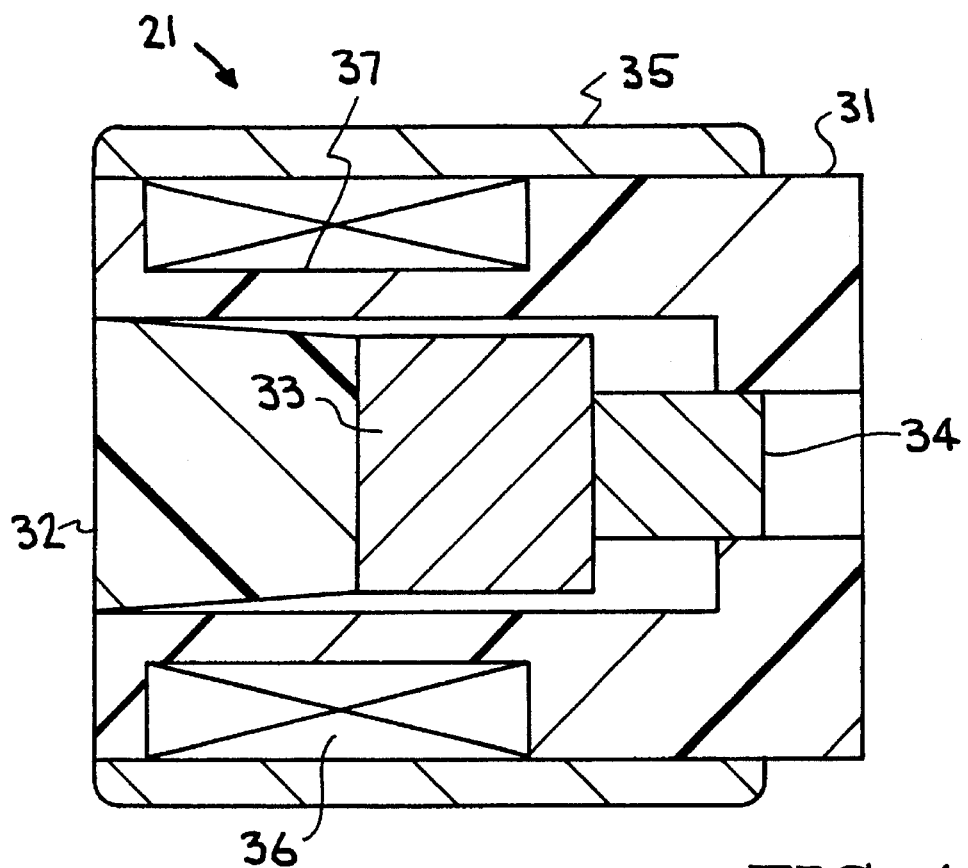
FIG. 4 depicts a cross section of one of the actuators of the present invention.

FIG. 4 depicts the cross-section of one of the actuators 21. The individual actuator 21 consists of a nonmetallic spool 31 with a nonmetallic plug 32 at the base. The inner portion of the spool 31 has a rare earth magnet 33 and a stainless steel plunger or contactor 34. A coil 36 of insulated copper-coated wire (e.g., 40 AWG) is wrapped around the spool 31 so that part of the magnet 33 lies within the circumference of the coil 36. The magnet 33 and contactor 34 slide within the inner circumferential cavity of the spool 31. A stainless steel housing 35 surrounds the spool 31 and encloses the coil 36 within an annular groove 37 (FIG. 4A) in the spool 31.

FIG. 4A depicts the spool 31 by itself. The spool 31 is preferably made of lucite, delrin, lexan or a similar plastic material. The spool 31 has an annular groove 37 at its base, in which the coil 36 is disposed. The annular groove must be of sufficient volume to enclose the number of turns in the coil 36. For example, if a 40 AWG insulated copper wire is used, and 200 turns are used for the coil 46, the inner diameter of the annular groove 37 must be about 0.113 inches. The inner circumferential surface 38 of the spool 31 must be smooth to allow the magnet 33 to slide up and down the interior of the spool 31. The spool 31 has a large bore hole 30 in one end and a small axially extending bore hole 39 in its center at the other end through which the contactor 34 moves when pushed by the magnet 33. The large bore hole 30 forms the cavity in which the magnet 33 and contactor 34 move.

FIG. 4B depicts a nylon plug 32. The nylon plug 32 has a tapered diameter to allow the plug 32 to fit snugly within the large bore hole 30 (FIG. 4A) in the spool 31. The diameter of the plug 32 at its larger end 40 is slightly larger than the large bore hole 30 (FIG. 4A) in the spool 31, while the diameter of the plug 32 at its smaller end 42 is smaller than the larger bore hole 30 (FIG. 4A). This permits the plug 32 to act like a cork and fit snugly within the large bore hole 30 (FIG. 4A). For example, the spool 31 has an outer diameter of about 0.178 inches and an inner diameter of about 0.087 inches. In this case, the plug 34 is about 0.088 inches at one end, and tapers to about 0.080 inches in diameter at the other end.

FIG. 4C depicts the rare earth magnet 33. The rare earth magnet is made from, for example, Samarium-Cobalt (SmCo) or Neodymium (Nd), or some other equivalent magnetic material. The magnet 33 has a diameter that is slightly smaller than the diameter of the inner circumferential surface 38 (FIG. 4A) of the spool 31. For example, if the spool 31 has an inner diameter of 0.087 inches, the magnet is about 0.080 inches in diameter and 0.080 inches in length. Another embodiment employs a magnet of 0.060 inches in diameter and 0.060 inches in length, with a coil that has about 100 turns.

FIG. 4D depicts the plunger or contactor 34. The contactor 34 is made so that it is attracted to the magnet 33, which controls the contactor's movement. For example, the contactor can be made of 410 stainless steel. The contactor 34 has a diameter that is slightly smaller than the small bore hole 39 (FIG. 4A) and a length that is longer than the small bore hole 39 (FIG. 4A) so that the contactor 34 easily extends out of the small bore hole 39 (FIG. 4A). For example, the bore hole 39 (FIG. 4A) at the top of the spool 31 has a diameter of about 0.045 inches, through which the contactor 34 moves to press against the skin of the user. In this case, the contactor 34 has a diameter of about 0.040 inches and a length of about 0.059 inches.

FIGS. 4E and 4F depict the stainless steel sleeve 35. The sleeve 35 is made of a ferrous material, e.g., stainless steel. The sleeve 35 has an inner diameter that is slightly larger than the outer diameter of the spool 31 to house the coil 36 and spool 31. For example, the stainless steel sleeve 35 has an outer diameter of about 0.225 inches and an inner diameter of about 0.188 inches to allow the sleeve 35 to fit snugly around the spool 31. The sleeve 35 protects the entire actuator 21 when assembled. The spool 31 is bonded into the sleeve 35. The sleeve 35 has a length that is slightly shorter than the spool 31 to permit the outer diameter of the actuator to be minimal at the point where the contactor 34 touches the skin of the user. For example, the sleeve has a length of about 0.238 inches, whereas the spool 31 has a length of about 0.268 inches.

The use of a stainless steel sleeve 35 eliminates crosstalk between the actuators 21, which is critical as the number of actuators 21 is increased. The magnet field created by the coil 36 has lines of flux that exit the top and enter the bottom of the actuators 21, and then curve to run along the length of the actuators 21. The stainless steel sleeve 35 causes these flux lines to run through the sleeve 35 to the other end of the actuators 21 thereby completing the magnetic circuit and thus restricting the interference between adjacent actuators 21. If the stainless steel sleeve 35 was not used, the magnetic field would extend farther out from the center of the actuators 21, hence the stainless steel sleeve 35 narrows the width of the magnetic field and increases the flux density-at these locations.

Figure 5A:
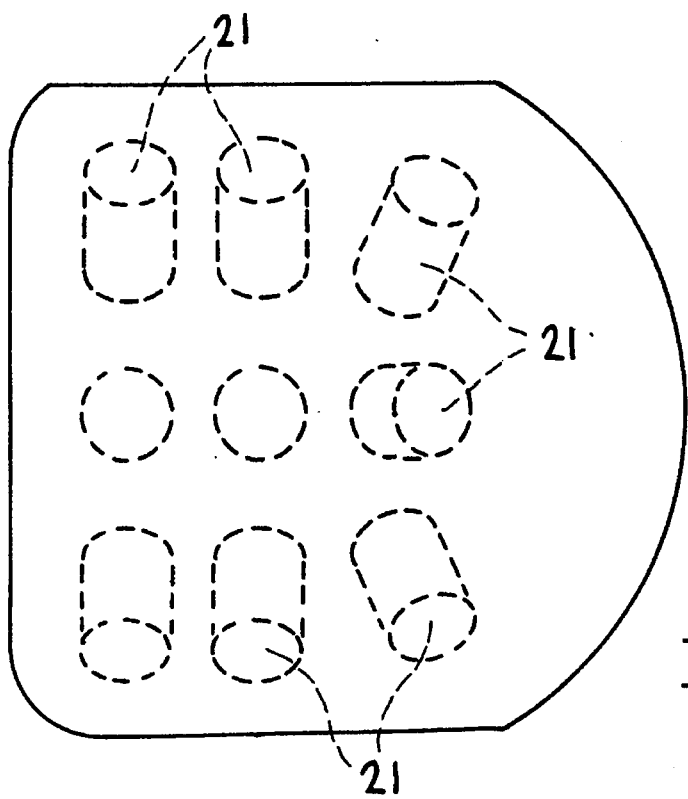
FIG. 5 an alternative embodiment of the actuator assembly, in which the actuators are not parallel with each other.
Figure 5B:
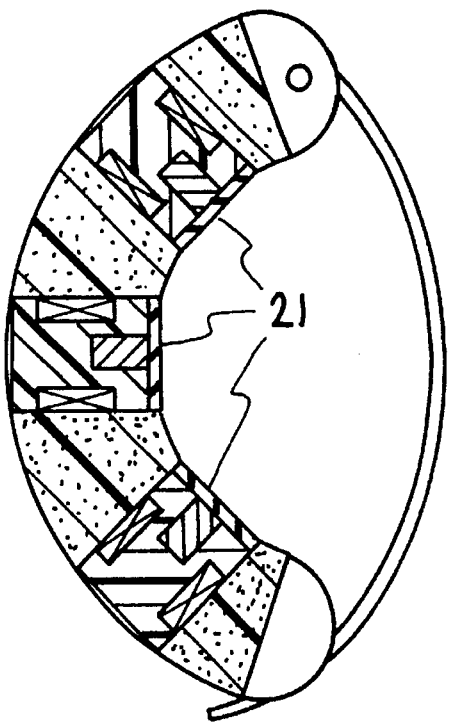
Figure 5C:
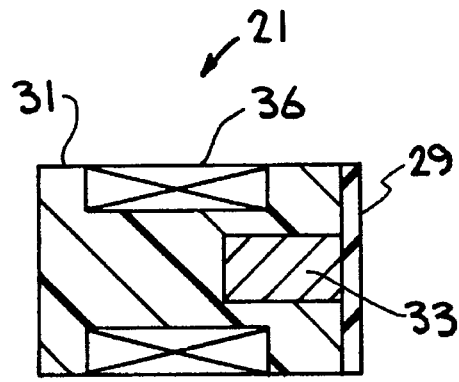

FIG. 5 depicts an alternative embodiment of the actuator assembly 11, 13, 15, 16, shown in FIG. 1. In this embodiment, the actuators 21 are not parallel to each other, but are disposed to follow the contour of a human finger. In addition, a rubber sheet 29 is used as the contact to the skin. In this embodiment, the plunger 33 is made of a non-ferrous material. Since a ferrous plunger acts like a magnetic antenna, a non-ferrous plunger reduces interference from adjacent actuators. In each actuator, a magnetic field exits the top and bottom of the actuators 21, which interferes with the magnetic field in an adjacent actuator, if the actuators are close together. Alternatively, by placing the actuators 21 in parallel, the magnetic fields do not intersect, thus reducing this interference effect.

Referring now to FIG. 4, when the actuator 21 is energized, the rare earth magnet 33 and its associated contactor 34 are set in motion by the opposing electromagnetic field of the coil 36. The magnet 33 pushes the contactor 34 forward to contact the skin resulting in the sensation of touch. Typically, the contactor 34 travels about 0.010 inches. When the electromagnetic field is turned off, the rare earth magnet 33 and the contactor 34 return to their neutral positions due to the magnetic equilibrium caused by the interaction with the ferrous outer sleeve 35. Thus, the ferrous outer sleeve 35 acts as the recoil mechanism in the actuator 21.

FIG. 6 depicts the tactile assembly 11, 13, or 15 (FIG. 1) when sewn in a glove 18. The user's finger 14 inside the glove 18 is contacted by the contactor 34. Further details of this configuration are shown in FIGS. 6A–6F. As shown in FIG 3, the fabric mesh 4 is sewn into the glove 18.

Figure 6A:
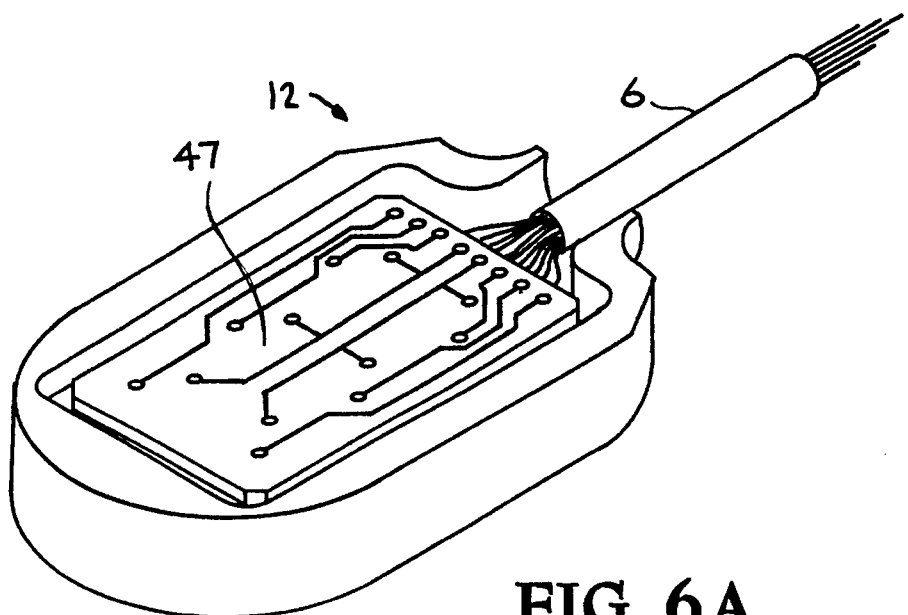
FIGS. 6A–6F depict different views of the actuator shown in FIG. 6.

FIG. 6A depicts the bottom side of the flexible housing 12 for the actuator assembly with the flexible foam lid 40 (FIG 6B) and the fabric mesh 4 removed. A flexible printed circuit board 47 is used to make the connections from the cable 6 to the coils 36 in the actuators 21 (as shown in FIG 4). Each coil 36 has two connections, so that each actuator 21 is addressable by the computer 1. In this embodiment, two wires are provided as common grounds. The flexible housing 41 is made of a flexible foam material. One possible flexible foam material consists of a foam material manufactured by General Electric, GE 762 Foam. Another possible bonding material includes soft cell ethylene propylene manufactured by Atlas Rubber Company.

Figure 6B:
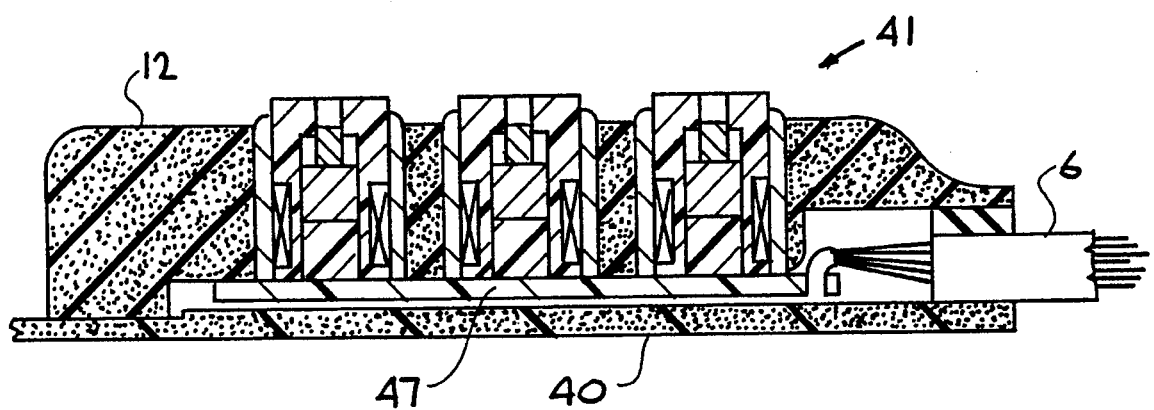

FIG. 6B depicts a cross-section of the actuator assembly in its housing 41. A flexible foam molded lid 40 is bonded to the mesh fabric 4 (not shown in FIG. 6B) and to the bottom side of the flexible housing 12. The flexible circuit board 47 is enclosed by the flexible housing 41. The flexible circuit board 47 makes connections (shown in FIG. 6D) to the coils 36.

Figure 6C:
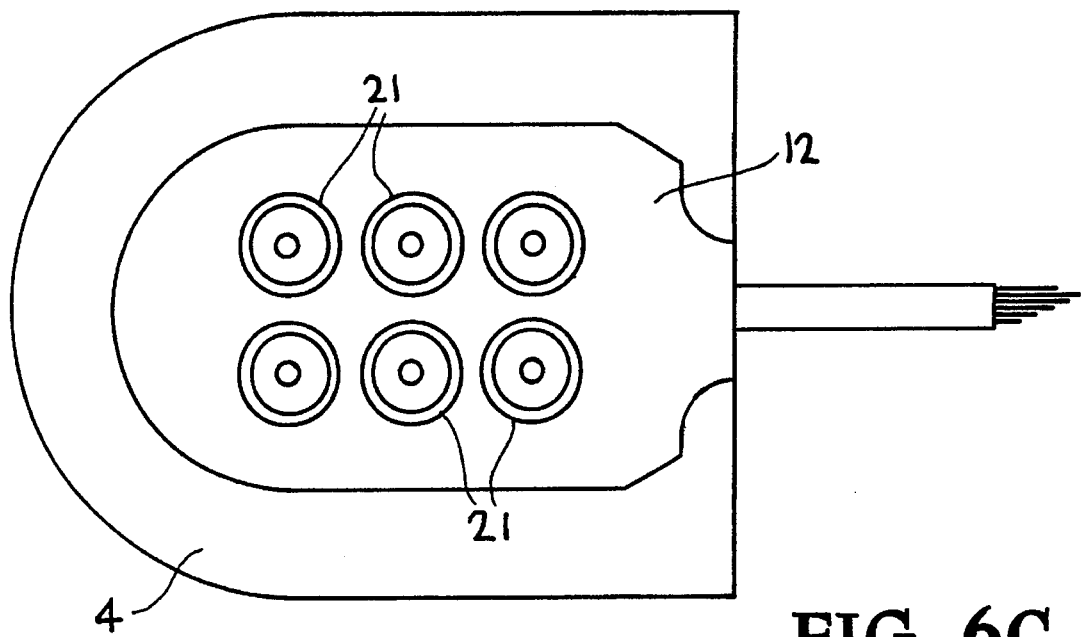

FIG. 6C depicts a top view of the flexible housing 12, with the bottoms of the actuators 21 shown. The fabric mesh 4 is bonded to the bottom of the flexible housing 12.

Figure 6D:
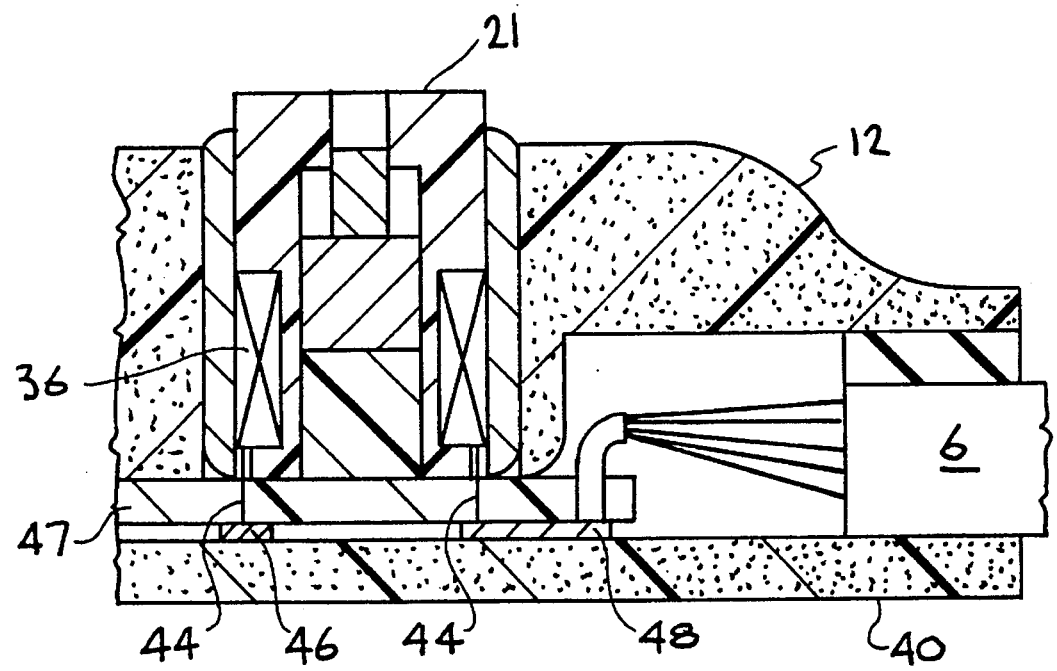

FIG. 6D depicts a blow-up of the flexible housing 12 to illustrate the interconnections between the cable 6 and the coils 36. The wires within the cable 6 are first soldered to cable solder landing points 48, which connects the wires to the flexible circuit board 47. The ends 44 of the coils 36 are brought through holes (not shown) in the flexible circuit board 47 and soldered to the solder landing points 46 on the flexible circuit board 47. The flexible circuit board 47, then makes the necessary connections between the ends 44 of the coils 36 and the wires in the cable 6.

Figure 6E:
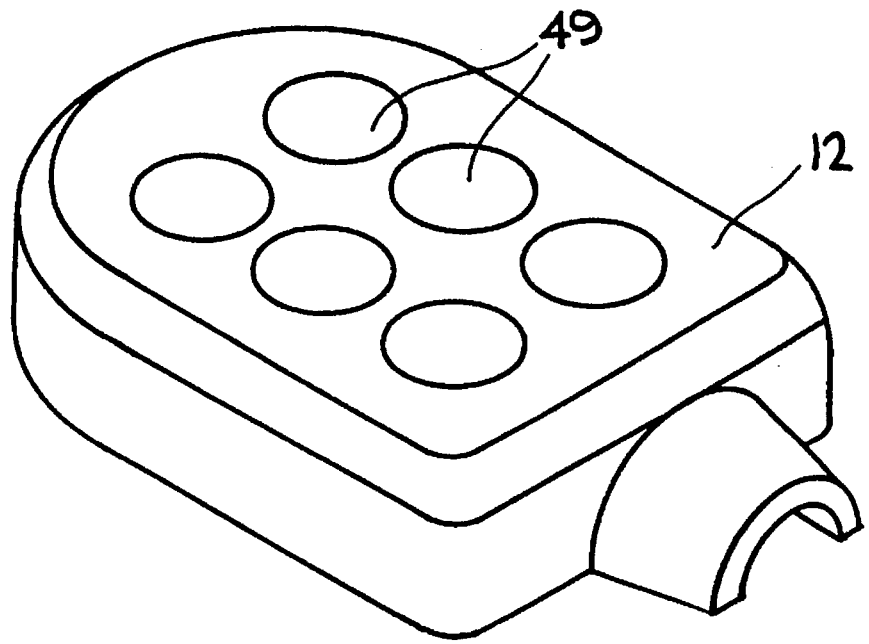
Figure 6F:
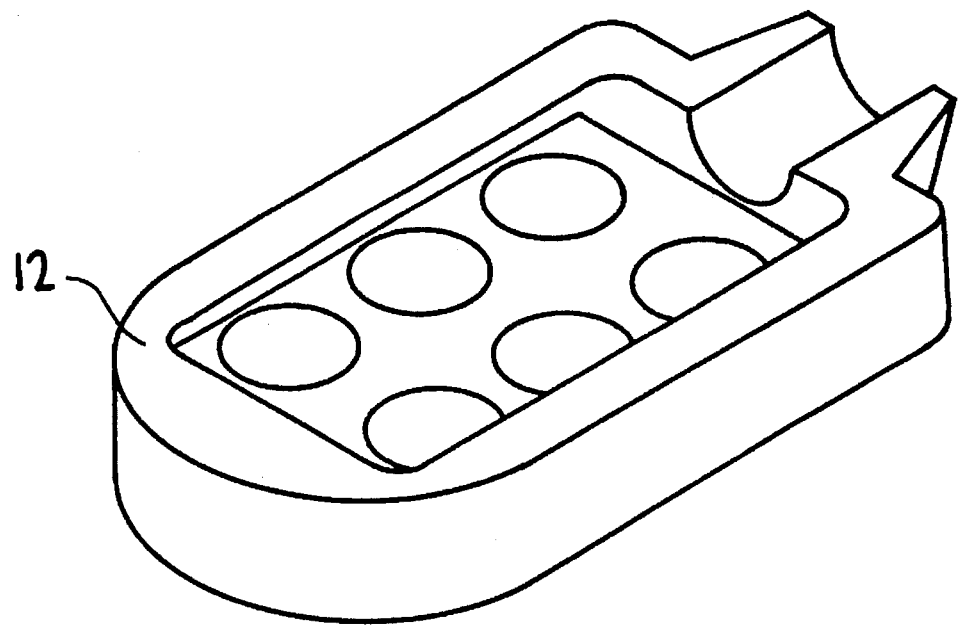

FIGS. 6E and 6F depict the bottom of the flexible housing 12, without the actuators 21 in place. In this embodiment, six actuators 21 in a matrix are bonded in the flexible foam housing 41 to enhance skin contact. The housing 12 consists of a foam material with holes 49 through which the outer sleeves 35 of the actuators 21 pass. The actuators 21 are bonded to a flexible printed circuit board 47, which is depicted in greater detail in FIG. 7.

Figure 7:
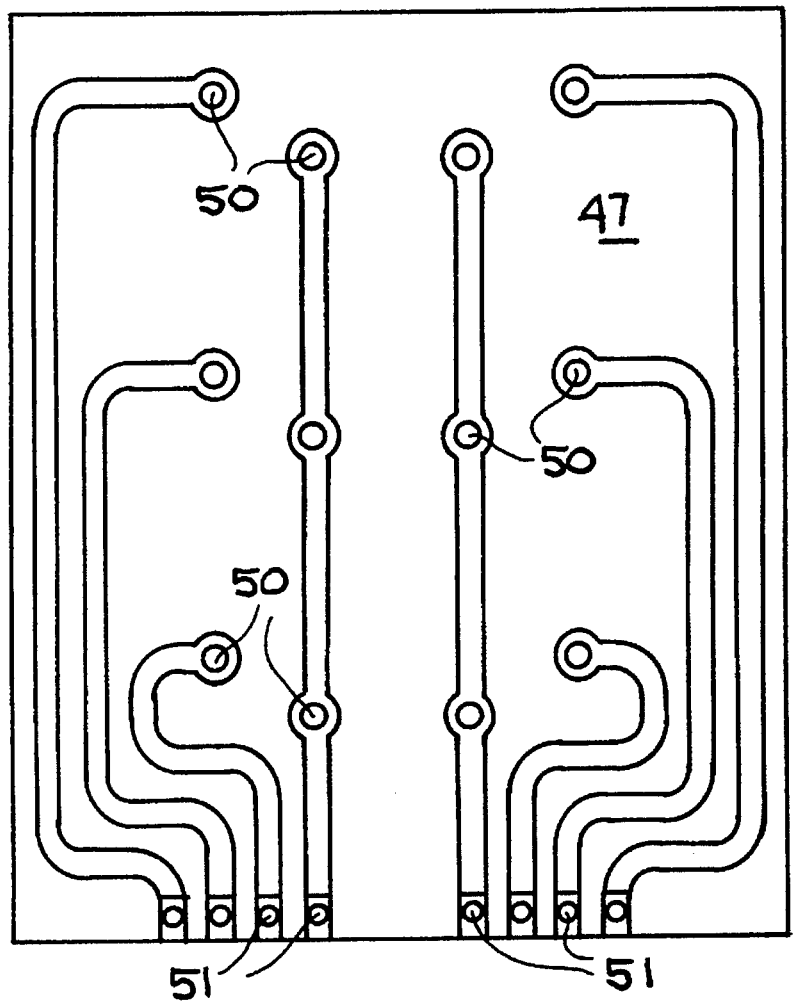
FIG. 7 depicts the flexible printed circuit board used in the actuator assembly of FIG. 6.
Figure 8:
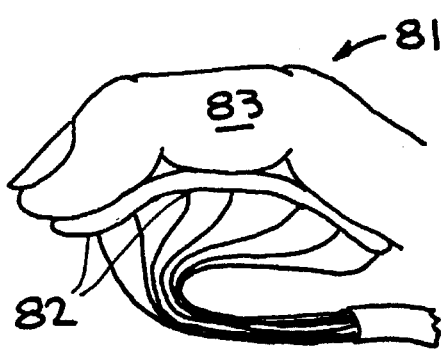
FIGS. 8–10 depict three different versions of the pneumatic stimulation systems of the prior art.
Figure 9:
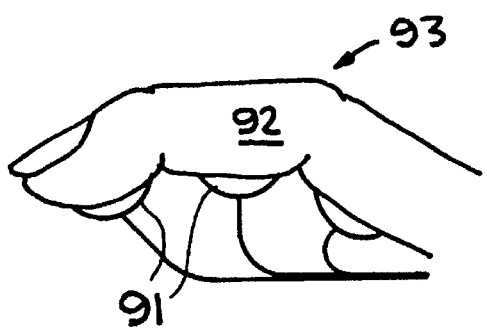
Figure 10:
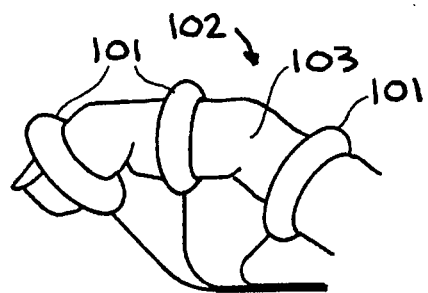
Figure 11:
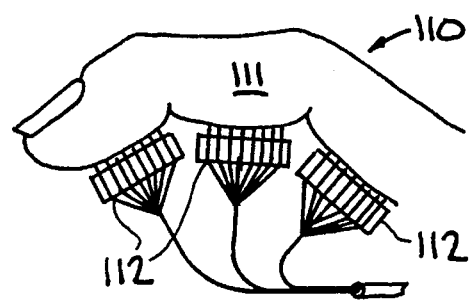
FIG. 11 depicts a vibro-tactile stimulation system of the prior art.
Figure 12:
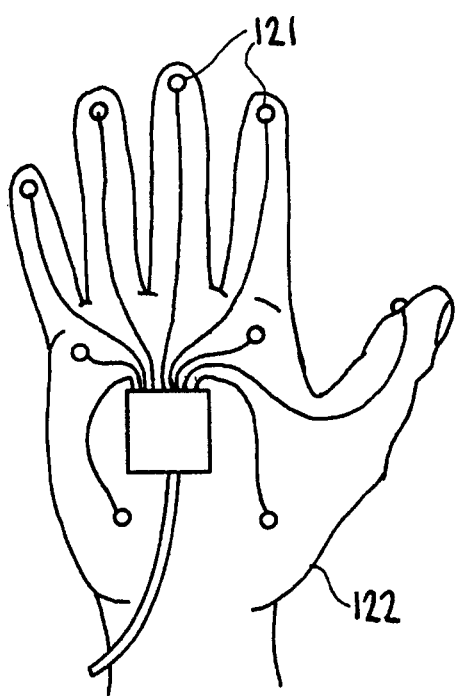
FIG. 12 depicts an electrotactile system of the prior art.
Figure 14:
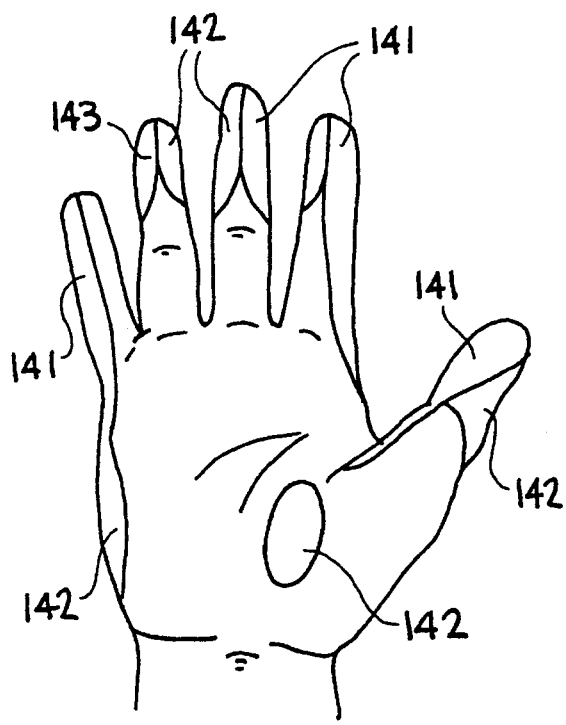
FIG. 14 depicts the zones of the palm and fingers of the human hand that are functional during grasping and manipulation tasks.
Figure 13:
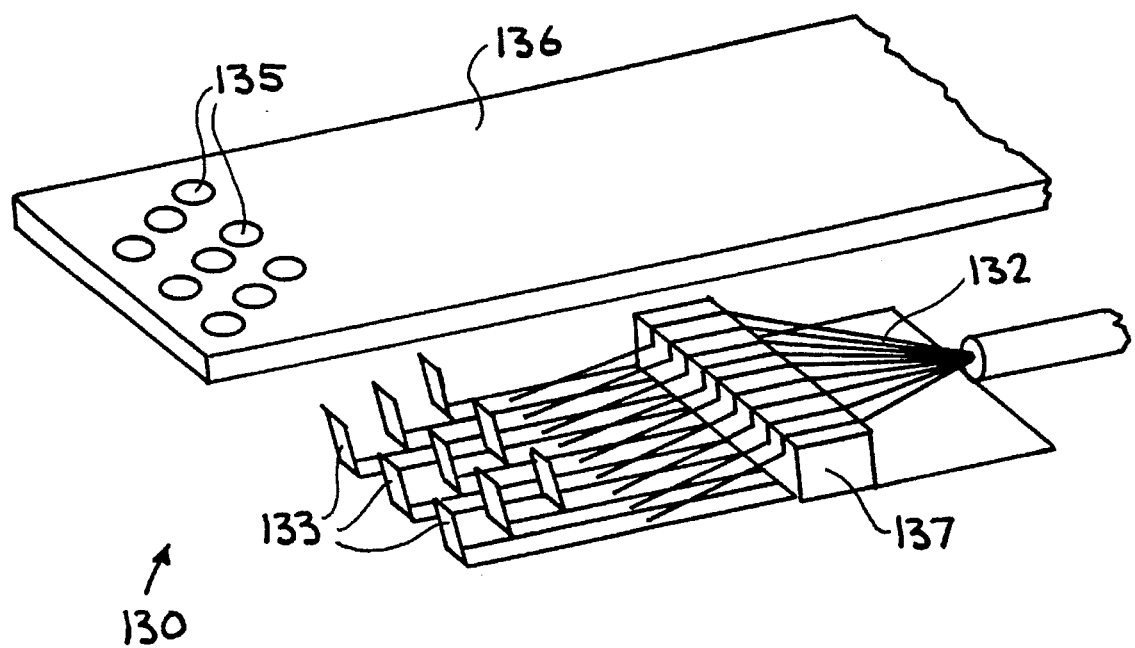
FIG. 13 depicts a prior art system that uses an array of contacts made of a shaped metal alloy.

FIG. 7 shows the flexible printed circuit board 47. Through holes 50 are provided through which the ends 44 of the coils 36 pass (as shown in FIG. 6D). Additional holes 51 are provided through which the wires of cable 6 pass. Both the ends 44 and the wires of the cable 6 are then soldered to the flexible printed circuit board, as described above.

The system of the present invention uses an RS-232 data link to provide frequency, waveform type, phase and amplitude signals to the coils 36 in the actuators 21, which control the contastor 34 in each actuator 21. This design allows the actuators 21 to perform over the full sensory frequency bandwidth, i.e., 0–300 Hertz, with dynamic amplitude variations.

Each of the actuators 21 is individually addressable by the computer 1 and drive electronics, such as an IBM PC compatible or similar device and the waveform generators 2. The present embodiment of the drive electronics includes existing waveform generator cards 2 manufactured by National Instruments. These generator cards 2, each of which has 10 channels, permit the program running on the PC to output specific types of waveforms, such as square waves, sawtooth waves, triangular waves, sinusoidal waves, etc. The program specifies the type of wave, the amplitude, phase and frequency, and the waveform generator cards 2 then output the specified wave. The waveform output by the waveform generator cards 2 controls the movement of the magnet 33, which affects the sensation of touch given to the user. Thus any type of waveform may be transmitted to any of the actuators 21 to simulate whatever sensation desired.

The drive electronics 3 converts the low level signals output by the waveform generator cards 2 into the levels necessary to control the movement of the magnet 33. The signals output by the generator cards range from 0 to 2 volts at about 10 mA, while the signals output by the drive electronics 3 range from 0 to 5 volts at about 80 mA. The present embodiment of the drive electronics consists of amplifiers manufactured by BurrBrown. These amplifiers have a relatively high slew rate.

By using a flexible back plane printed circuit board 47, as well as actuator bonding material, the whole device conforms to the skin's contour, which is a major improvement over the existing rigid body designs.

By placing more actuators 21 in the tactile actuator assembly 11, 13, 15, 16, textures and edge detection are feasible in a virtual environment. There is an upper limit to the number of actuators 21 that one can include in the matrix of actuators. As the actuators 21 decrease in size, the rare earth magnet 33 decreases in mass. At some point the mass of the magnet 33 is insufficient to enable the human finger to sense when the contactor 34 touches the skin. The embodiment of the present invention uses a rare earth magnet with a diameter that varies between 0.040 to 0.080 inches. At 0.040 inches in diameter, one can barely feel the plunger when it contacts the skin. At 0.080 inches, the actuator requires an operating current of approximately 60 mA. At 0.060 inches, the actuator requires only about 35–40 mA. Another embodiment uses an 0.080 inch diameter magnet 33 with half as many turns to reduce the diameter of the actuator 21. Consequently, the velocity of the rare earth magnet 33 must be increased to provide the appropriate sensation. As a result, the power must be increased to the electromagnet.

The operation of an embodiment of the entire system will now be described. The computer 1 executes a program that simulates particular types of surfaces by specifying a series of waveforms for each actuator. The resulting combination of contacts by the actuators 21 with the skin simulates the desired surface. For example, the system might send a series of square waves having a particular frequency, amplitude and phase to one set of actuators, while sending a series of triangular waves to another set of actuators and while sending a third series of sinusoidal waves to yet another set of actuators 21. How to simulate surfaces using certain waveforms having the appropriate frequency, amplitude and phase is merely a matter of trial and error, and does not form part of the present invention. All that is required is that one be able to select certain waveforms with predeterminable frequencies, amplitudes and phases. Once the program specifies the types of waveforms and their associated characteristics, i.e., amplitude, frequency, and phase, the computer 1 outputs these to a series of waveform generators 2 that generate the desired waves with the specified characteristics. The waveforms output by these generators 2 are low level signals, e.g., 0–2 volts at 10 mA, which are converted to 0–5 volt at 60–80 mA signals by the amplifiers 3. These signals are then routed by the wiring 7, 9, 17 to the flexible printed circuit board 47, which has wiring paths coupled to the coil 36 in each actuator. The ends of the coils 36 are brought through holes in the printed circuit board, and are bonded to the printed circuit board as depicted in FIG. 7. Each actuator 21 receives its own waveform independently of all other actuators 21. This permits complete flexibility in simulating the desired surface in the virtual environment. The coil then creates a magnetic field that is a function of the waveform sent by the computer. This causes the magnet 33 to move in and out of the coil at a frequency and phase and amplitude specified by the waveform sent to the coil. Actually, the magnetic field pushes the magnet 33 out of the coil and the ferrous sleeve 35 pulls the magnet 33 back in the coil. The interaction of these two forces permits the system to control the movement of the magnet, and hence the contactor 34. Consequently, the plunger or contact 34 moves under the direction of the magnet at the same frequency, phase and amplitude specified by the computer. When the waveform is removed from the coil 36, the magnet retracts back into the center of the coil 36 due to the interaction of the magnet and the ferrous outer sleeve, which then causes the contactor to retract inside the housing 31 of the actuator 21. The interaction of the contactors 34 with the skin of the user creates the desired effect of simulating the surface in a virtual environment. Thus, the system of the present invention permits one to specify any type of waveform to any of the actuators located at significant places on the user's skin to simulate the sense of touch in a synthetic environment.

Another application for the system of the present invention is to use tactile feedback symbols to simulate the sensation of braille letters moving across the finger tips of a visually-impaired person so that he or she can "read" a book simply by wearing the gloves of the present invention. In this implementation, the letters of a book in electronic form would be converted to signals that represent the feel of braille letters as the fingertips are passed over the braille letters. This would allow the user to read a book by simply wearing the gloves of the present invention. Although many books exist in braille form, many more exist in CD-Rom form for use on personal computers. The system just described would allow a visually-impaired user to buy commercially available books on CD-ROM and then "read" them using only his PC and the system of the present invention.

Another possible use for the present invention is to simulate tactile sensation on the entire body. By sewing actuators 21 in a full body suit, in which the actuators are located at specific points on the body, e.g., feet, legs, arms, face, etc., it becomes possible to simulate tactile sensation on the entire body. Since the actuators of the present invention are sufficiently small and inexpensive, placing them all over the body is now possible.

The actuator of the present invention can be scaled in size for applications where larger forces are desired. By increasing the weight of the magnet in proportion to the current design and by increasing the current, a larger impact on the user is possible.

The actuator of the present invention is also useful for an accelerometer. By applying the acceleration force to the contact 34, the resulting current output from the coil 36 due to the moving magnet 33 is indicative of the level of acceleration applied to the contact 34.

Finally, the actuator of the present invention may be used wherever precise control of the actuation is desired. The simple design of this actuator, particularly its use of the ferrous sleeve as the recoil mechanism, allows the actuator to be used in many different applications.

What is claimed is:

1. A system for providing a sense of touch on a sensing area of a user's skin by converting electrical signals from a controller to tactile sensations produced by an actuator assembly, the actuator assembly comprising:

a) a plurality of individually addressable actuators for contacting the sensing area of the user's skin, wherein the plurality of individually addressable actuators is arranged in a matrix, each actuator including;
 1) a nonferrous spool having an axial cavity, wherein the cavity has one open end,
 2) a magnet slidably disposed within the cavity,
 3) a contactor adjacent the magnet, and
 4) a coil wrapped around the nonferrous spool such that the magnet is at least partially within the circumference of the coil,
 b) a sleeve disposed around the nonferrous spool, wherein the sleeve encloses the nonferrous spool and the coil disposed thereon and isolates a magnetic field produced by the coil when the coil is energized by an electrical signal such that the magnetic field remains substantially within the nonferrous spool and sleeve; and
 c) a flexible enclosure housing the matrix of actuators and providing for coupling the electrical signals received from the controller to at least one of the actuators in the actuator assembly, wherein the flexible enclosure conforms substantially to a contour of the area of the user's skin.

2. The system of claim 1, wherein the individually addressable actuators have an operating bandwidth of less than about 300 Hz.

3. The system of claim 1, wherein the sleeve is comprised of a ferrous material.

4. The system of claim 1, wherein the magnet is selected from the group consisting of Samarium-Cobalt, Neodymium and rare earth magnet materials and combinations thereof.

5. The system of claim 1, wherein the nonferrous spool is elected from the group consisting of lucite, delrin and lexan and combinations thereof.

6. The system of claim 1, wherein the flexible enclosure further comprises:

a) a flexible printed circuit having a plurality of wiring path pairs, at least one for each actuator, wherein each wiring path pair is coupled to the coil in each actuators; and
 b) a flexible structure holding the matrix of actuators in place and being bonded to the flexible printed circuit.

7. A system for providing a sensation of touch to a user, wherein electrical signals are transmitted to a glove worn by the user, the glove comprising:

a) a plurality of matrices of actuators being disposed in the glove, wherein each actuator in each of said matrices of actuators is individually addressable, and wherein each actuator includes;
 i) a nonferrous spool having an axial cavity, wherein the cavity has one open end, ii) a magnet slidably disposed within the cavity, iii) a contactor adjacent the magnet, and iv) a coil wrapped around the nonferrous spool such that the magnet is at least partially within the circumference of the coil, b) a sleeve disposed around the nonferrous spool, wherein the sleeve encloses the nonferrous spool and the coil disposed thereon and isolates a magnetic field produced by the coil when the coil is energized by an electrical signal such that the magnetic field remains substantially within the nonferrous spool and sleeve; and c) a plurality of wires being disposed in the glove, one pair of wires for each actuator, each of the wire pairs transmitting an electrical signal to at least one of the actuators, thereby energizing the coil in said one actuator and causing the contactor to contact the user's skin.

8. The system according to claim 7, wherein the electrical signals energize each coil in each actuator independently of all other coils, thereby simulating a sense of touch.

9. The system of claim 7, further comprising one matrix of actuators being disposed in an index finger of the glove, one matrix of actuators being disposed in a thumb of the glove, and one matrix of actuators being disposed in a middle finger of the glove.

10. The system of claim 9, further comprising one of the matrix of actuators being disposed in a palm region of the glove.

11. An apparatus for providing a sense of touch to a user, comprising:

a) a plurality of tactile actuator assemblies, one for a different area of the user's skin, each tactile actuator assembly including;

i) a matrix of tactile actuators, each tactile actuator including;

1) a nonferrous spool having an axial cavity, wherein the cavity has one open end, 2) a magnet slidably disposed within the cavity, 3) a contactor adjacent the magnet, 4) a coil wrapped around the nonferrous spool such that the magnet is at least partially within the circumference of the coil, and 5) a sleeve disposed around the nonferrous spool, wherein the sleeve encloses the nonferrous spool and the coil disposed thereon and isolates a magnetic field produced by the coil when the coil is energized by an electrical signal such that the magnetic field remains substantially within the nonferrous spool and sleeve, ii) a flexible enclosure conforming substantially to the area of the user's skin and housing the matrix of tactile actuators and including a plurality of wire pairs, at least one pair for each of the tactile actuators, each of said one wire pairs being coupled to the coil in one of the tactile actuators in the matrix of tactile actuators such that each actuator is individually addressable; and b) a controller coupled to each tactile actuator and transmitting electrical control signals to each tactile actuator, which electrical control signals control the frequency and amplitude of movement of all of the contactors in all of the tactile actuators independently of each other.

12. The apparatus of claim 4, wherein the controller comprises a processor and waveform generator, wherein the processor provides at least one of wave type, frequency, phase and amplitude to the waveform generator and the waveform generator outputs a unique waveform to each coil within each of the tactile actuators in all of the actuator assemblies.

13. A method of providing a sensation of touch to a user, comprising the steps of:

a) specifying a waveform for each of a plurality of electrical control signals;

b) controlling the movement of a plurality of magnets disposed near the skin of the user by energizing a plurality of coils with the plurality of electrical control signals; and c) contacting the skin of the user with a plurality of contactors being driven by a plurality of magnets.

14. The method of claim 13, further comprising the steps of;

d) disposing a plurality of actuators on the skin of the user, wherein each actuator includes;

i) a nonferrous spool having an axial cavity, wherein the cavity has one open end, ii) a magnet slidably disposed within the cavity, iii) a contactor adjacent the magnet, iv) a coil wrapped around the nonferrous spool such that the magnet is at least partially within the circumference of the coil, and v) a sleeve disposed around the nonferrous spool, wherein the sleeve encloses the nonferrous spool and the coil disposed thereon and isolates a magnetic field produced by the coil when the coil is energized by an electrical signal such that the magnetic field remains substantially within the nonferrous spool and sleeve, e) transmitting at least one electrical control signal to the coil in at least one of the actuators; and f) contacting the user's skin with the contactor in said one actuator as a function of said one electrical control signal.

15. The method of claim 13, wherein the step of specifying further comprises specifying at least one of frequency, amplitude, phase and waveform type for each electrical control signal, and wherein the step of contacting further comprises contacting the user's skin according to the frequency, amplitude, phase and waveform type of the electrical control signal.

* * * * *